Nov. 12, 1968 J. ELICH 3,411,021
LINE DRIVER FOR MODIFYING LENGTHS OF POLAR SIGNALS
Filed Oct. 23, 1965
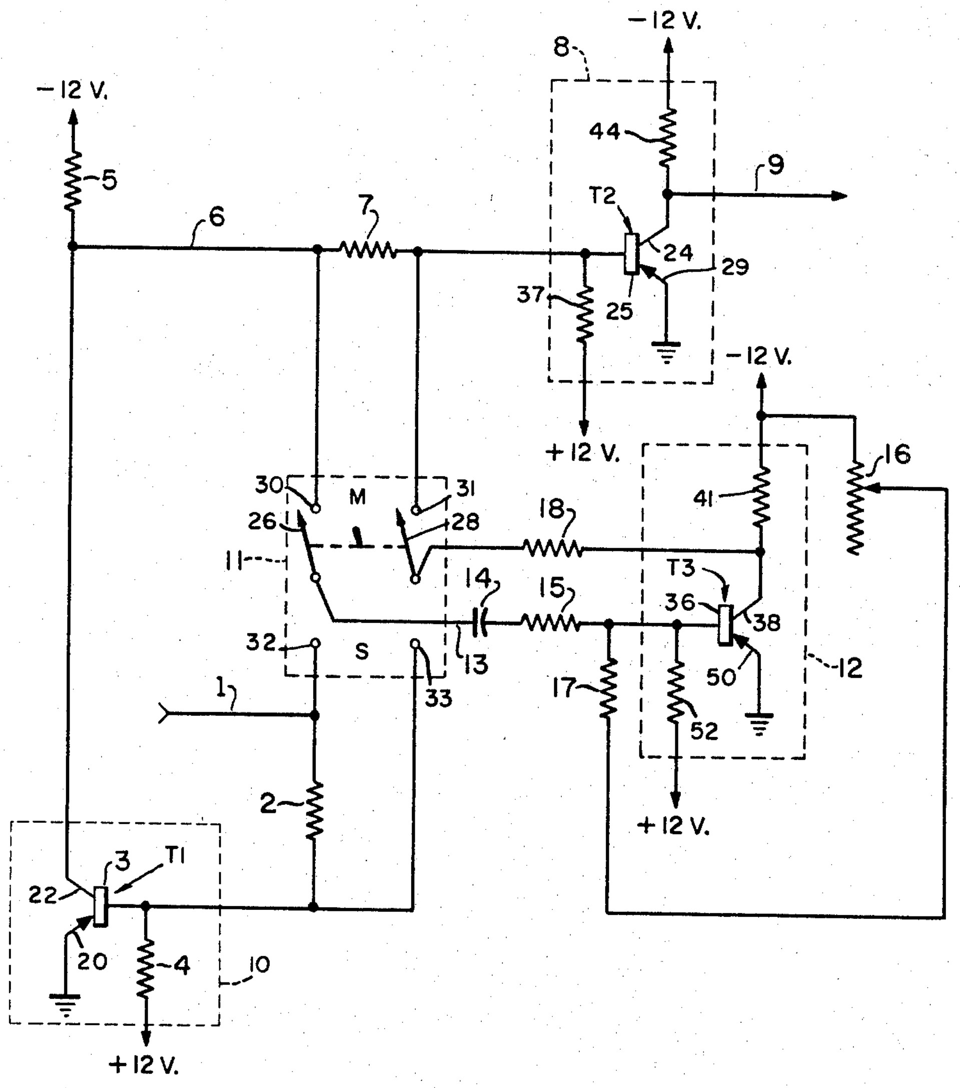
INVENTOR:
JOHN ELICH
BY [signature]
ATTORNEY.

United States Patent Office 3,411,021
Patented Nov. 12, 1968

3,411,021

LINE DRIVER FOR MODIFYING LENGTHS OF POLAR SIGNALS

John Elich, Staten Island, N.Y., assignor to The Western Union Telegraph Company, New York, N.Y., a corporation of New York Filed Oct. 23, 1965, Ser. No. 502,908
4 Claims. (Cl. 307—265)

ABSTRACT OF THE DISCLOSURE

The disclosure describes a line driver circuit for a telegraph line in which alternating polar mark and space signals are transmitted. In order to compensate or correct for bias distortion in such a circuit either the mark or space pulses can be lengthened while the others are shortened. The circuit includes two stages of transistorized amplification. A time delay circuit controlled by a transistorized gate is connected via a double throw switch to either stage of amplification to effect the desired correction of pulse lengths.

This invention relates to the telegraphic transmission of information, and more particularly to novel means in a telegraph line driver for correcting distortion of line signals.

It is well known in the art that the transmission of intelligence signals, which consist ideally of rectangular waves of electrical current having individually predetermined form and amplitude, often is prejudiced by the incursion of distortion which takes the form of an undesired modification of the relative length of the said waves.

It is to the correction of these defects occurring in the transmission path of the telegraph wave that the present invention is directed.

Many devices have been proposed for location at the receiving end of a transmission line in order to thus correct such deterioration which has occurred to the signal during the course of transmission, and such devices as regenerative repeaters which also are capable of correcting a distorted waveform are well known to be useful for insertion into the transmission path at intermediate locations therein.

It is the purpose of the present invention, however, to provide means for so manipulating the shape of the aforesaid waves by electronic apparatus in advance of their transmission, as to cause their modification during transmission, which normally would constitute a distortion, to bring them closer to, and approximately the same as, an ideal wave shape at the receiving end of the transmission path.

This I accomplish by means of an amplifier comprising solid state components which is especially arranged and adapted to provide an adjustable pre-bias to the telegraph wave such that it will substantially neutralize the deficiencies which would exist in the unmodified wave after having been affected by distortion in traveling over the telegraph channel.

A particular advantage thereby gained lies in the fact that in a network of outlying transmitters connected to a central location primarily concerned with receiving, for example, it is quite sufficient and satisfactory to employ examples of the instant device which are located only on those transmitters sufficiently remote to require their use. Being small and sufficiently reliable to require no routine maintenance, such dispersion of the devices locates them in places where they are inexpensive to install (or may be installed as an integral part of the transmitter) and avoids the need for providing space for a concentration of them at a central location, at a considerable saving.

The bias device comprises a time delay circuit, and is capable of providing a rapid jump in the potential of the signal within the telegraph channel at an adjustable length of time after the beginning of such signal is sensed. It is arranged to be controlled by a switch in such a manner that wave shaping can be accomplished for either positive or negative keying.

A clearer understanding of the invention may be had by reference to the detailed description of a specific illustrative example of the invention when taken together with the drawing which depicts an electrical circuit diagram of the instant invention.

Turning now to the drawing there is seen a first amplifier stage 10. Input line 1 leads through input resistor 2 to the base 3 of a transistor T1 which is normally biased to cutoff by positive potential applied through biasing resistor 4 of relatively large value. Resistor 4 is connnected to base 3.

With its emitter 20 at ground, or zero potential as shown, transistor T1 will be driven from cutoff to saturation by appearance of a negative signal voltage between line 1 and ground, since its collector 22 is connected to negative power supply through load resistor 5.

Amplified signal output is thus produced by the first amplifier stage 10, and is applied through wire 6 and an input resistor 7 to a second amplifier stage 8 for second stage amplification. Amplifier circuit 8 includes a transistor amplifier T2 having a collector 24, base 25 and emitter 29. Input wire 6 is connected to base 25 via resistor 7. Emitter 29 is grounded. Collector 24 is connected to output line 9 of the line driver circuit. Negative battery potential is normally applied to line 9 via resistor 44 when transistor T2 is nonconductive.

Connected across the input resistor 2 in the line 1 leading to the first amplifier stage 10, and also across the input resistor 7 in the wire 6 leading to the second amplifier stage 8, so that a connection may be made alternatively to either, is the double-pole double-throw switch 11 having movable poles 26, 28 and fixed contacts 30, 31 32 and 33.

The circuitry connected to the movable poles 26, 28 of switch 11 comprises means for generating a negative voltage pulse of adjustable duration immediately upon the occurrence of an appropriate pulse in the telegraph line 1, and such negative voltage pulse is applied by the switch 11 to the base 3 of the first amplifier stage 10 or to the base 25 of the second amplifier stage 8 to prevent operation thereof until after a predetermined period of desired delay has occurred.

Specifically, this circuitry comprises a transistor amplifier gate circuit 12 having a transistor T3. Transistor T3 has a grounded emitter 50, a base 36 and a collector 38. The base is connected to positive potential via resistor 52 which renders the transistor nonconductive in the absence of signals applied via input wire 13. When transistor T3 is in nonconductive condition negative potential is applied to pole 28 of switch 11 via resistors 41 and 18. Resistor 41 is a voltage limiting resistor through which negative potential is applied to collector 38. Wire 13 is connectable by one pole 26 of switch 11 via switch contact 32 and input wire 1 to the first amplifier stage 10, or via switch contact 30 and input wire 6 to the second amplifier stage 8. Connected in series in wire 13 are a capacitor 14 and a resistor 15 constituting a delay circuit capable of retarding the application of any incoming voltage pulse to base 36 of transistor T3 for a predetermined period to sufficiently charge the capacitor 14. Rheostat 16 and resistor 17 in series connect base 36 to negative bias potential.

Since the amplifier circuit 12 is operated under gated, or switching conditions, relatively wide latitude of transistor base potential is permissible without any influence on its operation. The timing of the amplifier delay period is therefore rendered adjustable by the rheostat 16, which, in conjunction with resistor 17, establishes the quiescent potential bias level of the input to amplifier circuit 12 and hence controls the time required for a gradual buildup of potential across the capacitor 14 to overcome such bias and thus switch the amplifier transistor T3 into the conductive or saturated mode of operation.

When this occurs, ground is applied through limiting resistor 18 and, pole 28 and contact 33 of switch 11 to the base 3 of transistor T1 (when switch 11 is thrown downwardly to position S) and transistor T1 experiences the delayed cutoff associated with the corrective biasing of a negative telegraph spacing pulse. With switch 11 thrown upwardly to position M to close pole 28 with contact 31, the input wire 13 of amplifier circuit 12 is connected to wire 6 (which introduces a phase reversal in the signals passing through it). When the negative output of amplifier 12 taken from collector 38 through the resistor 18 is then applied to the input of second amplifier 8 it is effective to apply the delayed cutoff associated with the corrective biasing of a ground potential telegraph marking pulse.

If switch 11 is open as shown in the drawing, then it will be apparent that transistor T1 is rendered conductive when negative (spacing) potential is applied to base from line 1 so that wire 6 is grounded and transistor T2 is rendered nonconductive. Thus negative (spacing) potential is applied to line 9. When ground (marking) potential is applied to base 3 from line 1, transistor T1 is rendered nonconductive, and negative potential is applied via resistor 5 and line 6 to base 25 to render transistor T2 conductive. Thus ground (marking) potential is applied to line 9.

The telegraph line driver described above can be used to lengthen marking or spacing signals in a telegraph line by throwing switch 11 up to the marking (M) position or down to the spacing (S) position.

Suppose that lengthening of ground output (marking) pulses is desired. Switch 11 will be thrown to the up or M position shown in the drawing. Poles 26, 28 will then be closed with contacts 30, 31 respectively while contacts 32 and 33 will be open. When a negative (spacing) pulse arrives at line 1 at the completion of a ground (marking) pulse the transistor T1 will be rendered conductive and and its output at line 6 will be at ground potential. Transistor T3 at this time is conductive. The ground output at line 6 will be applied via contact 30 and pole 26 to the left or negative side of capacitor 14 so that a temporary positive biasing potential will be applied to transistor T3, to render it nonconductive. Depending on the setting of rheostat 16 adjusting the base bias of transistor T3, this transistor will be brought to nonconducting condition and will remain nonconducting for an interval determined by the time constant of the resistor-capacitor combination 14, 15. During this interval in which transistor T3 is nonconducting, negative potential is applied via resistor 41 and 18 to base 25 of transistor T2 to prevent this transistor which was conductive during the marking pulse from cutting off thereby maintaining the output at line 9 at marking (ground) potential. Upon completion of the discharge of capacitor 14 at the end of the above mentioned time interval transistor T3 will become conductive again.

Its ground potential output will then render transistor T2 nonconductive so that negative (spacing) potential appears at output line 9.

Suppose now that lengthening of negative output (spacing) pulses is desired at output line 9. Switch 11 will be thrown to the down or S position where poles 26, 28 are closed with contacts 32, 33 respectively. The arrival of a positive (ground) pulse at the completion of a negative spacing pulse will initiate the following operation. Transistor T2 has been nonconductive during the previous spacing pulse. Ground potential is applied via contact 32 and pole 26 to the negative or left side of capacitor 14. Positive potential is thus applied to base 36 and transistor T3 is biased to cut off condition for a time interval determined by the time constant of resistor-capacitor combination 14, 15. Negative potential is applied via resistor 18, pole 28 and contact 33 to base 3 of transistor T1 which prevents it from turning off during the discharge interval of capacitor 14. A positive potential is thus maintained at base 25 of transistor T2 keeping it in nonconducting condition so that the negative spacing pulse at output line 9 is lengthened while transistor T3 remains nonconductive.

From the foregoing it will be apparent that the line driver circuit serves to lengthen negative spacing pulses or ground marking pulses depending on the setting of switch 11.

What is claimed is:

1. A line driver circuit for modifying lengths of polar pulses in a transmission line, comprising:

(a) first, second and third transistors, each transistor having an individual input base, grounded emitter and output collector;

(b) first and second input resistors connected to the bases of the first and second transistors, said first input resistor being arranged to receive polar input pulses from said line to apply the same to the first transistor, the output collector of the first transistor being connected to the second input resistor to apply thereto pulses having polarity opposite from polarity of pulses applied to the first transistor;

(c) an output resistor connected to the collector of the third transistor;

(d) adjustable circuit means connected to the base of the third transistor to apply adjustable bias potential thereto;

(e) time delay means having an input for receiving polar input signals, and having an output connected to the base of the third transistor for overriding said bias potential for a predetermined time after receipt of each input pulse of selected polarity; and (f) further circuit means arranged to connect selectively the input of the delay means to either one of the first and second input resistors, and to connect selectively said output resistor to the base of either one of the first and second transistors, whereby output pulses of one polarity appearing at the output collector of the second transistor will be lengthened with respect to the length of corresponding input pulses of like polarity as applied to the first transistor, while output pulses of opposite polarity will be correspondingly shortened.

2. A line driver circuit as defined by claim 1, wherein the bias adjustment means comprises a variable resistor; and wherein the time delay means comprises a capacitor and resistor in series connection, so that adjustment of the variable resistor varies the charging time of the capacitor, and whereby lengthening of output pulses at the collector of the second transistor is adjustable and dependent on the setting of the variable resistor.

3. A line driver circuit as defined by claim 1, wherein said further circuit means comprises a double-pole, double-throw switch, so that output pulses of one polarity at the collector of the second transistor are lengthened when the switch is thrown in one position and output pulses of opposite polarity are lengthened when the switch is thrown in the other position.

4. A line driver circuit as defined by claim 3, wherein the bias adjustment means comprises a variable resistor; and wherein the time delay means comprises a capacitor and resistor in series connection, so that adjustment of the variable resistor varies the charging time of the capacitor, and whereby lengthening of output pulses at the collector of the second transistor is adjustable and dependent on the setting of the variable resistor.

References Cited

UNITED STATES PATENTS

| | | | |
|---|---|---|---|
| 3,130,327 | 4/1964 | Krossa et al. | 307—88.5 |
| 3,231,765 | 1/1966 | Martin et al. | 307—88.5 |

ARTHUR GAUSS, *Primary Examiner.*

J. ZAZWORSKY, *Assistant Examiner.*